US011884528B2

(12) United States Patent
Boscaro et al.

(10) Patent No.: US 11,884,528 B2
(45) Date of Patent: Jan. 30, 2024

(54) CAPPING MACHINE FOR CAPS MADE OF COMPRESSIBLE MATERIAL

(71) Applicant: MBF S.P.A., Veronella (IT)

(72) Inventors: Giuliano Boscaro, Veronella (IT); Alessandro Ticinelli, Veronella (IT); Andrea Stella, Veronella (IT)

(73) Assignee: MBF S.P.A., Verona (IT)

( * ) Notice: Subject to any disclaimer, the term of this patent is extended or adjusted under 35 U.S.C. 154(b) by 0 days.

(21) Appl. No.: 17/869,475

(22) Filed: Jul. 20, 2022

(65) Prior Publication Data

US 2023/0030340 A1 Feb. 2, 2023

(30) Foreign Application Priority Data

Jul. 23, 2021 (IT) ........................ 102021000019706

(51) Int. Cl.
*B67B 1/04* (2006.01)

(52) U.S. Cl.
CPC .......... *B67B 1/04* (2013.01); *B67B 2201/015* (2013.01)

(58) Field of Classification Search
CPC .. B67B 1/00; B67B 1/005; B67B 1/04; B67B 2201/00; B67B 2201/015; B65B 7/2821
USPC ........................... 53/309, 319, 322, 324, 367
See application file for complete search history.

(56) References Cited

U.S. PATENT DOCUMENTS 225,475 A * 3/1880 Hutchinson ............. B67B 1/005 53/264
391,760 A * 10/1888 Norton .................... B67B 1/045 53/322
1,260,392 A * 3/1918 Kaye ......................... B67B 1/04 53/306
1,992,693 A * 2/1935 Fagan et al. .............. B67B 1/10 53/319

(Continued)

FOREIGN PATENT DOCUMENTS

DE 20 2020 104 970 U1 10/2020
DE 202020104970 U1 * 11/2020 ............... B67B 1/04

(Continued)

OTHER PUBLICATIONS

Italian Search Report for Italian Patent Application No. 102021000019706 dated Apr. 8, 2022, 2 pages.

*Primary Examiner* — Stephen F. Gerrity
(74) *Attorney, Agent, or Firm* — Merchant & Gould P.C.

(57) ABSTRACT

A capping machine for caps made of compressible material includes a compression box and compression units, each being housed in a cavity in the compression box and defining a cap compression seat. A bottle centering device is associated with each compression unit and is mechanically associated with the compression box at a housing seat on a lower face. The capping machine includes a fastener for removably retaining each bottle centering device in its respective housing seat. The fastener includes for each bottle centering device a movable engagement element movably associated with the lower face moveable between: a locking position, (Continued)

wherein the movable engagement element interferes with the respective bottle centering device creating an undercut to retain the bottle centering device inside the housing seat; and an unlocking position, wherein the movable engagement element does not interfere, allowing the bottle centering device to freely engage or disengage the housing seat.

13 Claims, 11 Drawing Sheets

(56) References Cited

U.S. PATENT DOCUMENTS 3,214,886 A * 11/1965 Pechmann ............ B67B 3/2033
53/309

FOREIGN PATENT DOCUMENTS

| | | | | |
|---|---|---|---|---|
| EP | 1375412 A1 * | 1/2004 | ............... | B67B 1/04 |
| EP | 1 426 322 B1 | 11/2005 | | |
| EP | 2 860 148 A1 | 4/2015 | | |
| EP | 3 825 276 A1 | 5/2021 | | |
| FR | 1410942 A * | 9/1965 | ............... | B67B 1/00 |
| FR | 1442028 A * | 6/1966 | ............... | B67B 1/04 |
| FR | 2290387 A * | 7/1976 | ............... | B67B 1/00 |
| IT | 214969 | 12/1988 | | |
| JP | S61-60492 A | 3/1986 | | |

* cited by examiner

PRIOR ART

PRIOR ART

CAPPING MACHINE FOR CAPS MADE OF COMPRESSIBLE MATERIAL

CROSS-REFERENCE TO RELATED APPLICATION

This application claims benefit of Serial No. 102021000019706, filed 23 Jul. 2021 in Italy, and which application is incorporated herein by reference. To the extent appropriate, a claim of priority is made to the above-disclosed application.

FIELD OF APPLICATION

The present invention relates to a capping machine for caps made of compressible material.

Advantageously, the capping machine according to the invention may be a single capping machine or a multiple capping machine, of the rotary type.

PRIOR ART

In a capping machine for caps made of compressible material (cork or elastomeric material), illustrated for example in FIG. 1, the cap T is radially pre-compressed in a compression seat S defined by a compression unit G by a plurality of movable compression dowels (not shown). The compression unit G is housed in a special cavity Q formed in a so-called compression box F. In turn, the compression box F is provided with two openings, a lower F1 and an upper F2 aligned with the compression seat S. Through the action of an insertion punch P, axially aligned with the two openings F1 and F2 and the compression seat S, the compressed cap is then pushed into the neck of the bottle B located below the compression box. To ensure that there is perfect alignment between the axis of the bottle on one side and the axis of the compressed cap (corresponding to the axis of the compression seat) and the axis of the insertion punch on the other, the compression box is provided at the bottom with a centering device C at which the bottle abuts with the mouth. An example of a capping machine is described in the Italian patent for utility model 214969.

The centering of the bottle with respect to the compression seat of the capping machine should be carried out extremely precisely to ensure that, when the punch P pushes the cap T out of the compression seat S in its downward stroke, the cap fits perfectly into the neck of the bottle to the desired depth.

It is therefore evident that the centering of the bottle with respect to the compression seat is a fundamental operation for a correct introduction of the cap into the bottle. A slight misalignment of the elements involved (bottle B, cap T and punch P) would in fact generate an incorrect introduction of the cap with consequent compromise of the capping.

Generally, centering devices called bottle centering devices or mouthpieces are used to ensure such centering.

As shown in particular in FIG. 4, a bottle centering device C comprises a support structure C1, whereby it is mechanically associated with the compression box F of the capping machine at a suitable housing R open on the cap compression seat S. The support structure C1 defines a through opening A for the passage of the compressed cap T and of the cap insertion punch P of the capping machine. The support structure C1 is mounted on the compression box F in such a way that the through opening A has its own central axis X axially centered on said cap compression seat.

The bottle centering device C comprises bottle centering means C2 which are associated with said support structure C1. Such bottle centering means C2 define an invitation seat C3 which in turn:

- defines a central through opening C4,
- is intended in use to be engaged by a mouth of a bottle to be capped, and
- is shaped to guide the mouth towards said through opening A axially aligning the mouth itself (and therefore the neck of the bottle) with the central axis X of the through opening A.

In particular, the invitation seat C3 may be delimited by a truncated conical surface converging upwards. Operationally, when the bottle is pushed upwards by the lifting cylinders E to approach the compression seat S, it rests with the mouth on the truncated conical surface and, by sliding on it, is guided towards a position axially centered with respect to the compression seat S.

During the operating life of a capping machine, the bottle centering devices C are frequently disassembled and reassembled to allow them to be replaced during maintenance operations or following a change in the format of the bottle mouth to be capped. For this reason, the bottle centering devices C are mechanically associated with the compression box by screw or bolt fixing means V which connect the support structure C1 to the compression box F, implementing a connection of the removable type.

While the application and removal of screw or bolt fastening means is easy, it may not be done manually as the use of special tools is required. Furthermore, it requires the execution of a series of operations that do not allow immediate disassembly of the bottle centering device. In the case of multiple capping machines, which may also be provided with dozens of bottle centering devices, the operating times required for the disassembly of all the centering devices expand significantly, creating a long downtime.

In the field of capping machines for caps made of compressible material there is therefore a hitherto unsatisfied need to significantly reduce the downtime associated with the assembly and disassembly of bottle centering devices.

DISCLOSURE OF THE INVENTION

Therefore, the main object of the present invention is to eliminate in whole or in part the drawbacks of the aforementioned prior art, by providing a capping machine for caps made of compressible material which allows the disassembly and disassembly operations of the bottle centering devices to be sped up.

A further object of the present invention is to provide a capping machine for caps made of compressible material which is not operationally more complex to use than similar machines of known type.

A further object of the present invention is to provide a capping machine for caps made of compressible material which is not constructively more complex to produce than similar machines of known type.

BRIEF DESCRIPTION OF THE DRAWINGS

The technical features of the invention, according to the aforesaid objects, may be clearly seen in the contents of the claims below, and its advantages will become more readily apparent in the detailed description that follows, made with reference to the accompanying drawings, which represent one or more purely exemplifying and non-limiting embodiments thereof, wherein:

DETAILED DESCRIPTION

Figure 1:
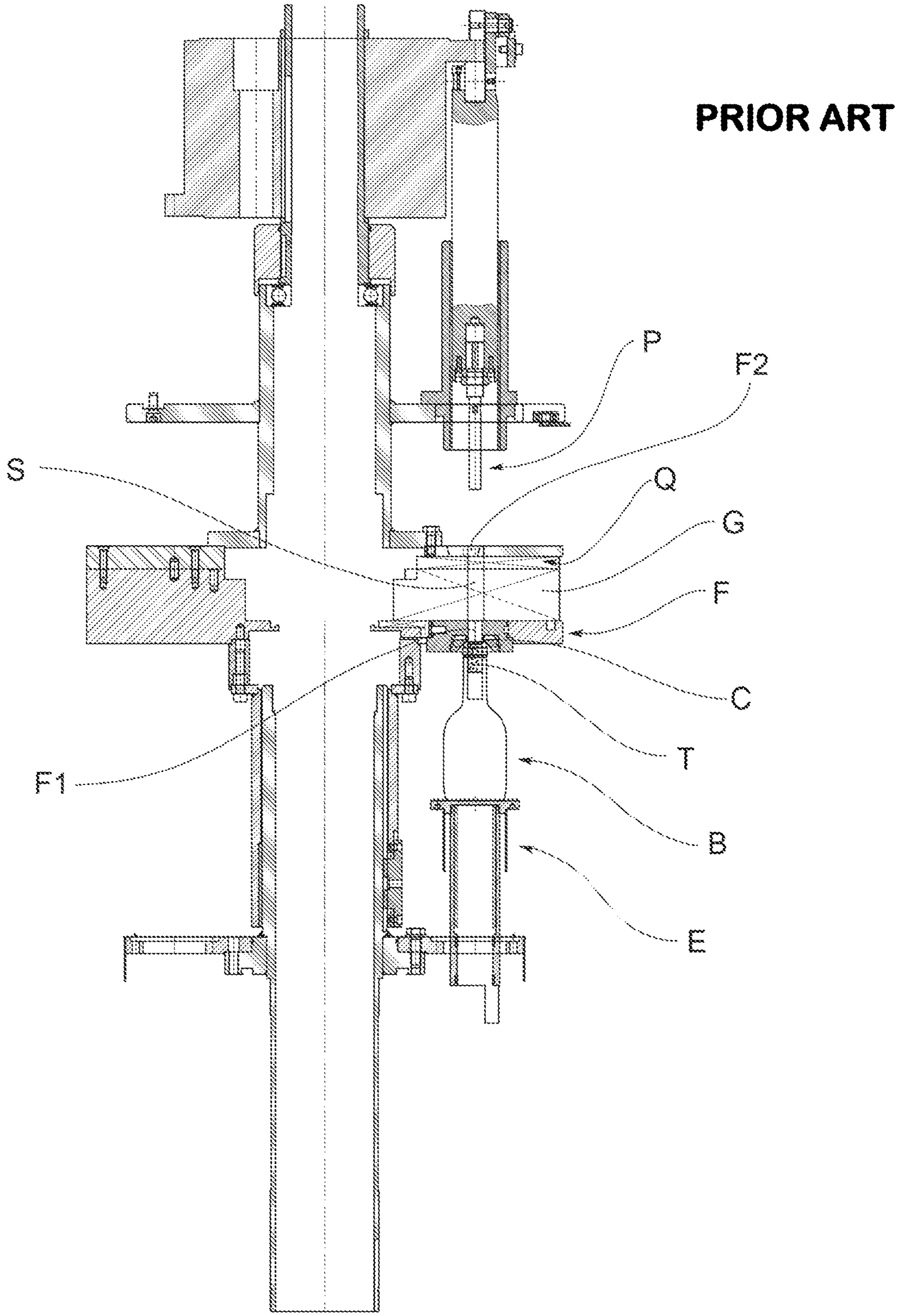
FIG. 1 shows a simplified sectional view of a traditional capping machine for caps made of compressible material.
Figure 2:
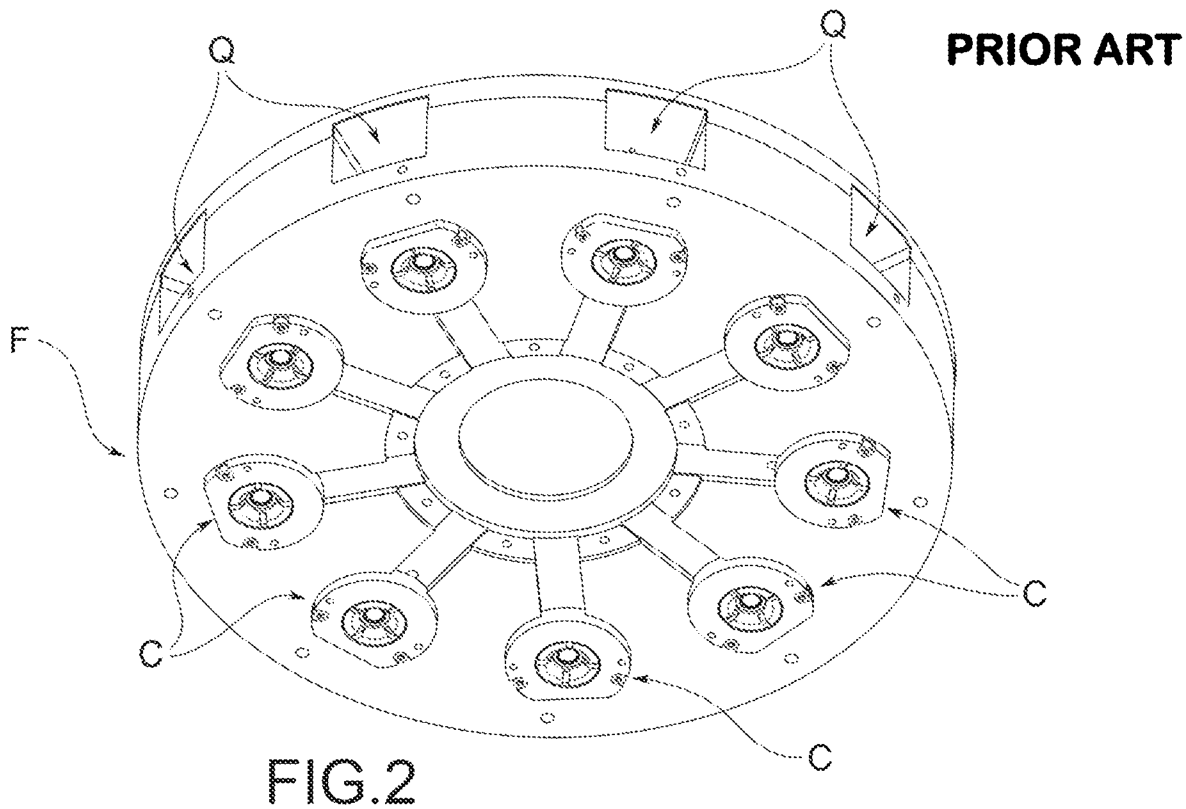
FIG. 2 shows a bottom perspective view of a compression box of a multiple capping machine of the traditional type, provided with a plurality of bottle centering devices associated with the compression box by screw or bolt fastening means.
Figure 3:
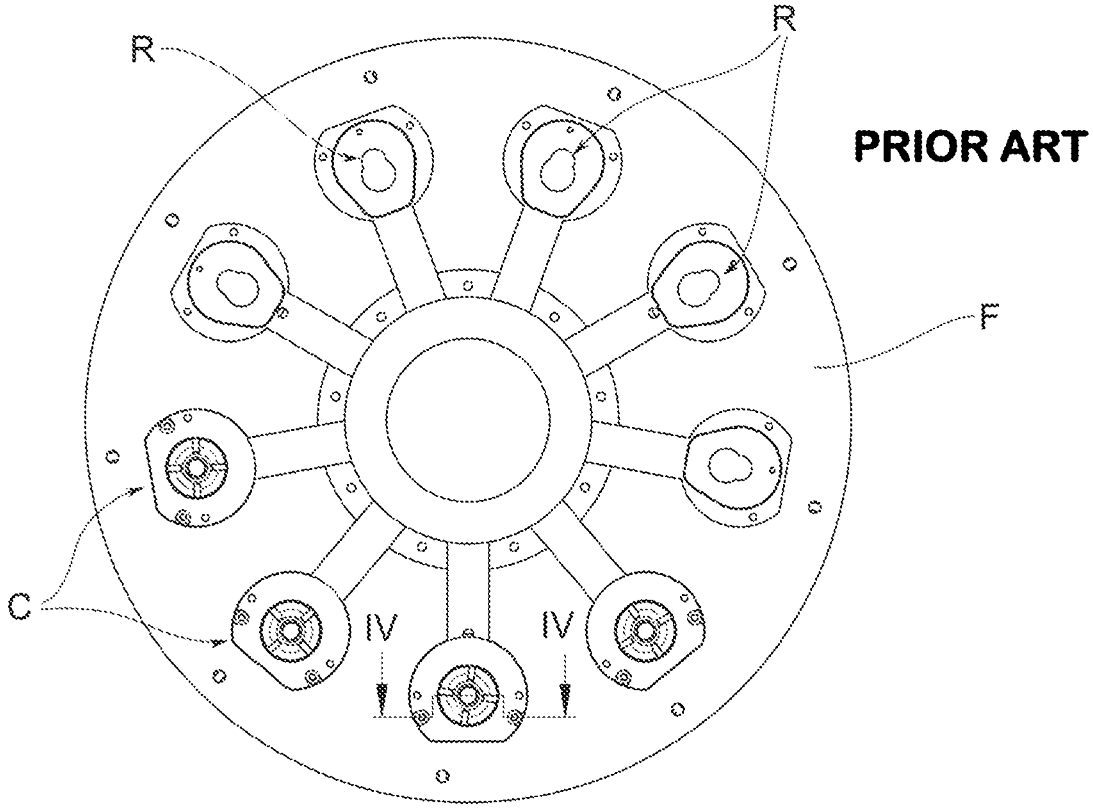
FIG. 3 shows an orthogonal plan view of the compression box of FIG. 2, illustrated with some bottle centering devices removed.
Figure 4:
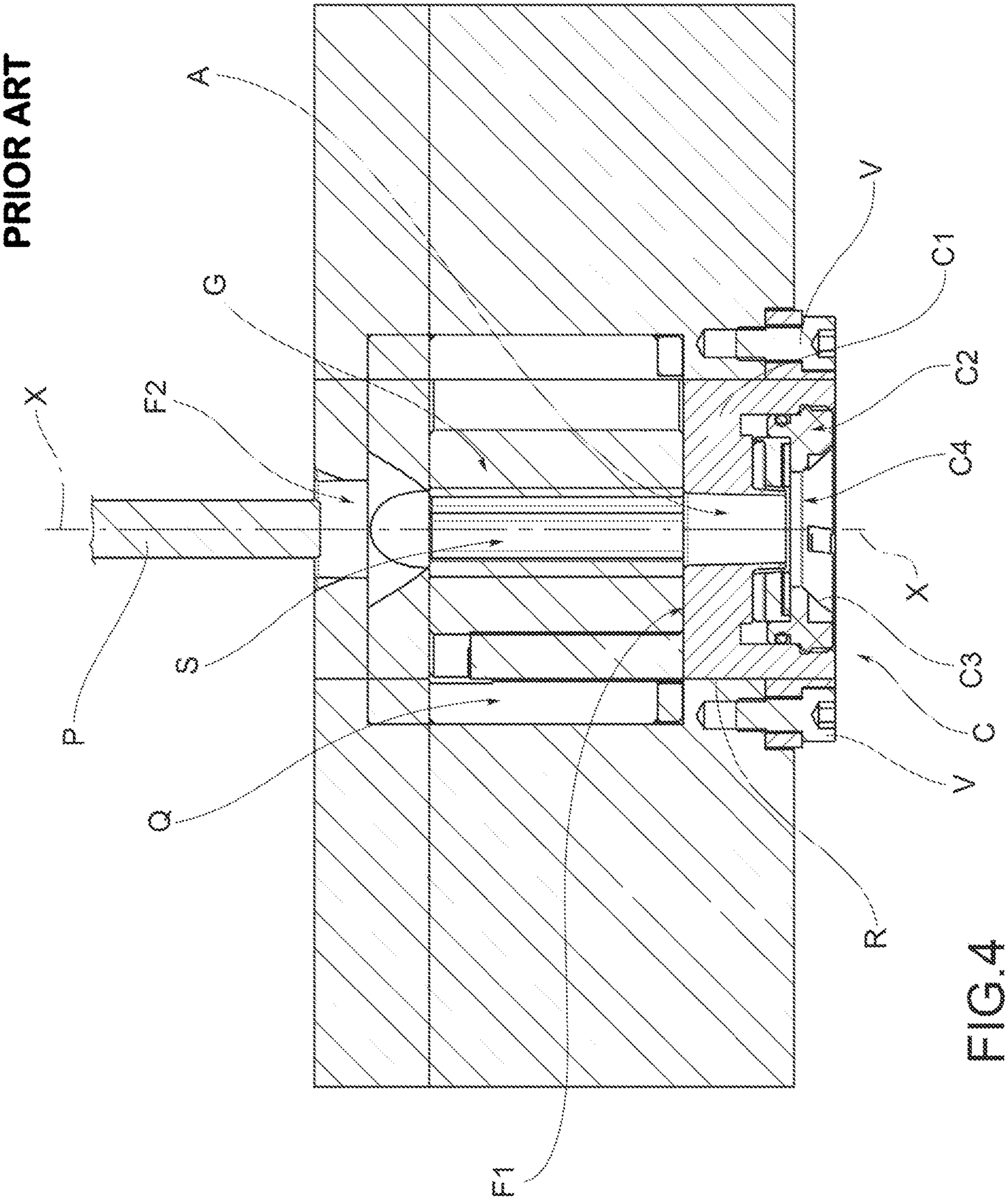
FIG. 4 shows a sectional view of a detail of the compression box of FIG. 3, made according to a section plane IV-IV indicated therein.
Figure 5:
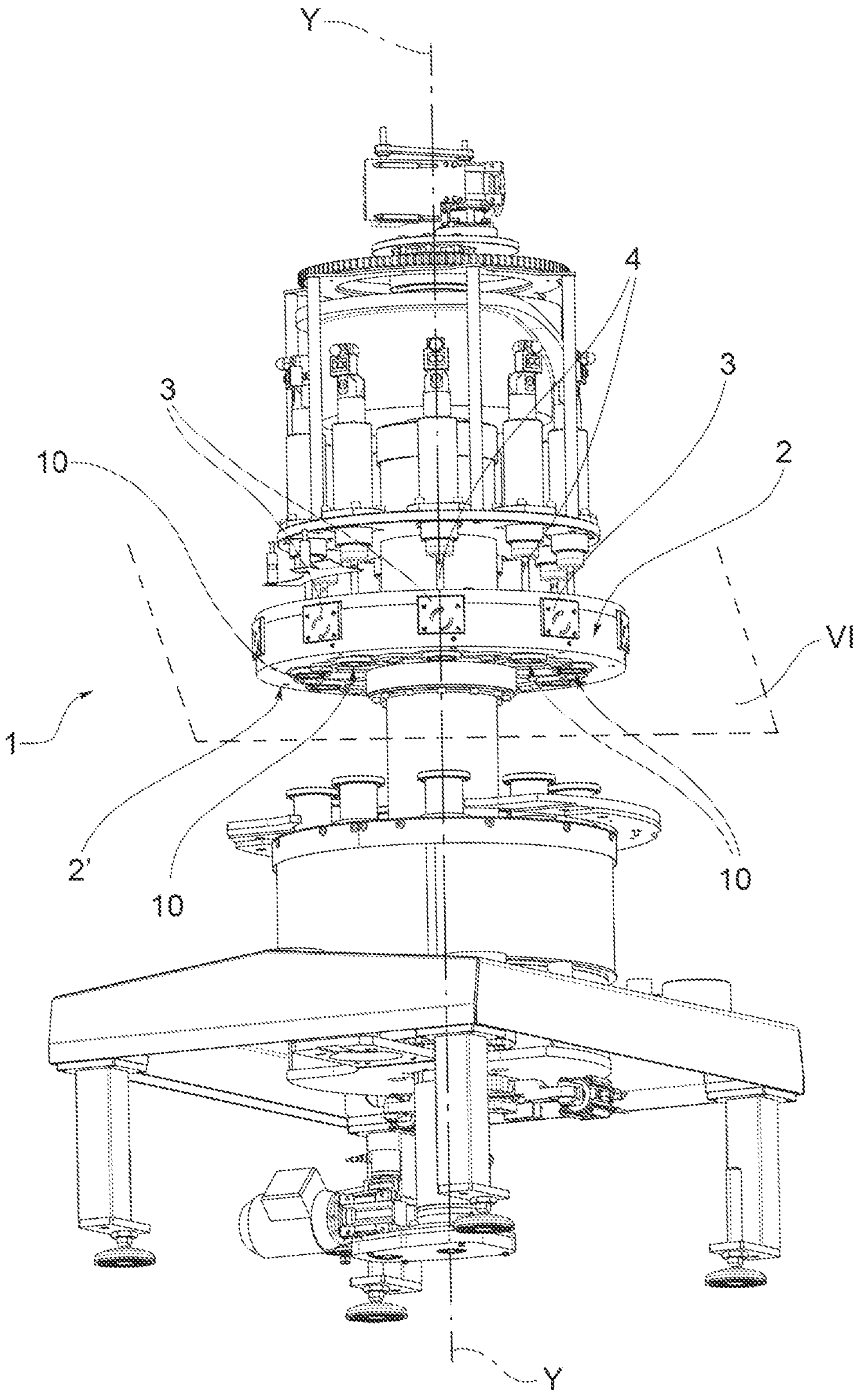
FIG. 5 shows a bottom perspective view of a capping machine for caps made of compressible material according to a preferred embodiment of the present invention.
Figure 6:
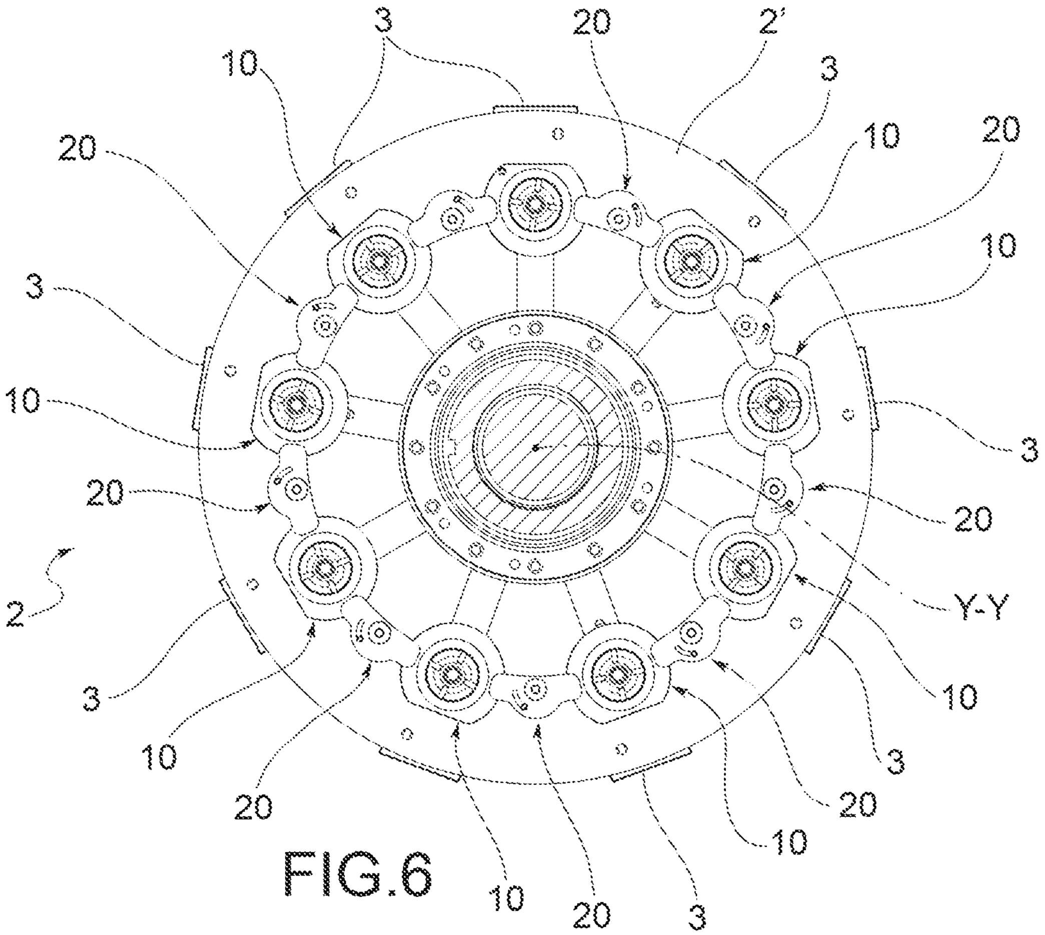
FIG. 6 shows an orthogonal sectional view of the machine of FIG. 6 according to the section plane VI-VI indicated therein.
Figure 7:
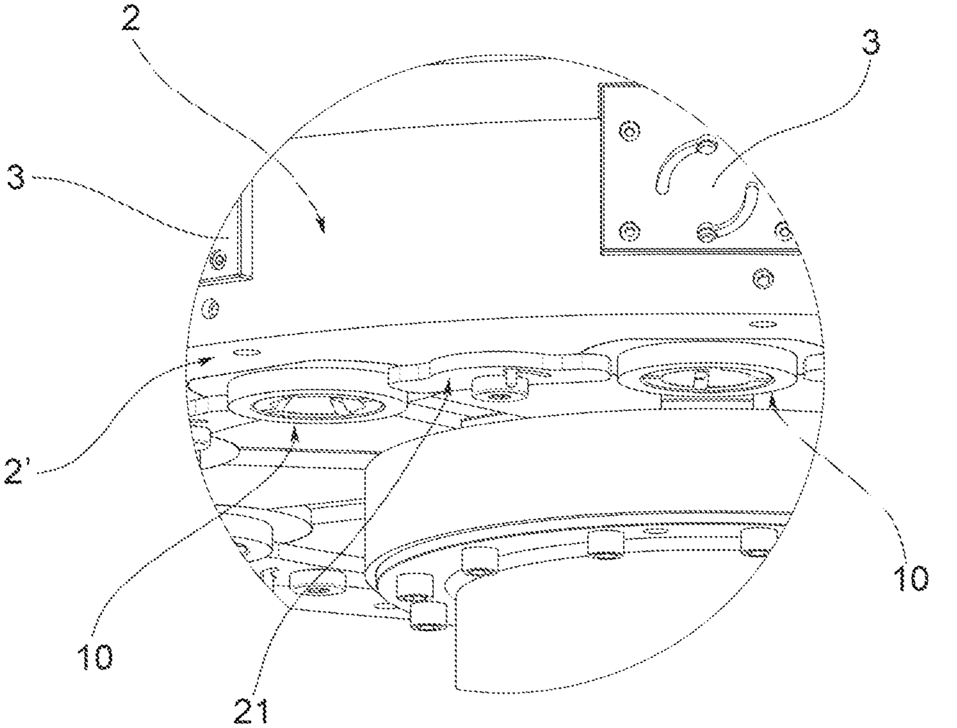
FIG. 7 shows an enlarged detail of the machine of FIG. 5 relating to fastening means of the bottle centering devices.
Figure 8:
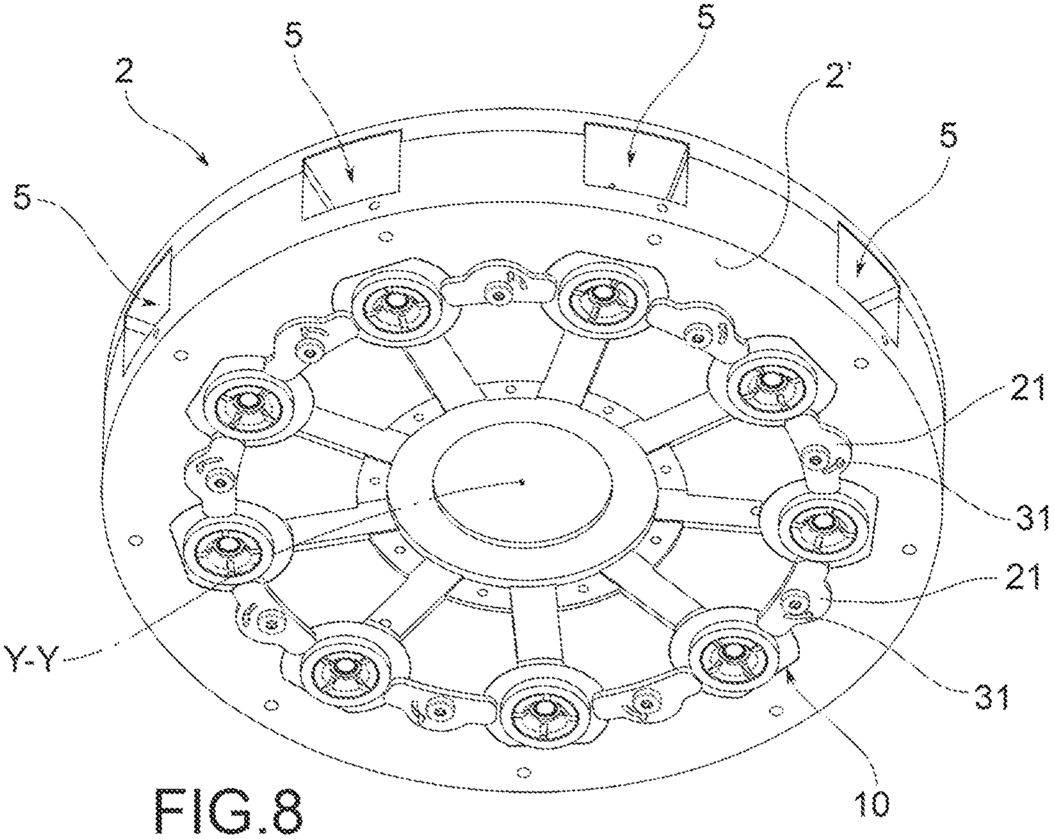
FIG. 8 shows a bottom perspective view of the compression box of the multiple capping machine of FIG. 5, illustrated with the fastening means of the bottle centering devices in the locking position.

The present invention relates to a capping machine for caps made of compressible material.

Advantageously, the capping machine according to the invention may be a single capping machine or a multiple capping machine, of the rotary type.

The capping machine according to the invention will be indicated as a whole with reference numeral 100 in the accompanying figures.

Herein and in the following of the description and the claims, reference will be made to the capping machine 1 in use condition. Therefore, any references to a lower or upper position or to a horizontal or vertical orientation should be interpreted in this sense.

According to a general embodiment of the invention, the capping machine 1 for caps made of compressible material comprises:

- a compression box 2;
- one or more compression units 3, each of which is housed in a specially provided cavity 5 made in said compression box and defines a cap compression seat 6;
- a cap insertion punch 4 for each compression unit 3;
- a bottle centering device 10 for each compression unit 3.

In general, the compression box 2, the cap compression units 3, the cap insertion punches 4 and the bottle centering devices 10 may be of any type suitable for the purpose. In particular, the cap compression units 102 may be of the type described in the Italian utility model 214969 or in the European patent EP 1426322 B1.

The compression box 2, the cap compression units 3, the cap insertion punches 4 and the bottle centering devices 10 of a capping machine for caps made of compressible material are per se known to those skilled in the art. For this reason, a detailed description will not be provided, but only a description of the features necessary for the understanding of the present invention will be provided.

More in detail, each bottle centering device 10 defines an invitation seat 11 for centering the mouth of a bottle to be capped on a central axis X.

Each bottle centering device 10 is mechanically associated with the compression box 2 at a housing seat 7 which is obtained on a lower face 2' of said compression box 2 and is open on said cavity 5.

Figure 10:
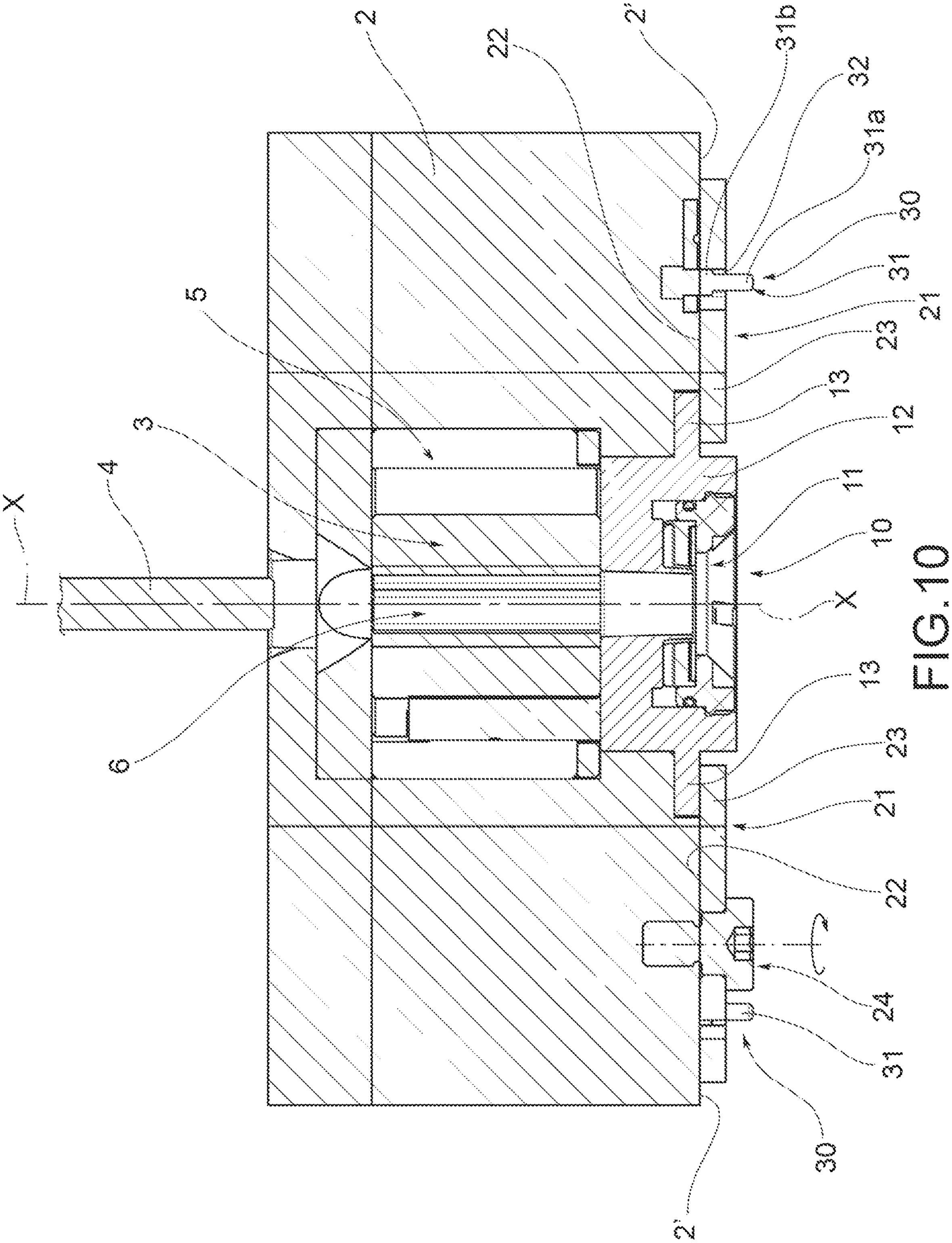
FIG. 10 shows a sectional view of a detail of the compression box of FIG. 9, relating to a bottle centering device engaged by the respective fastening means in the locking position, the section being made according to a section plane X-X indicated therein.
Figure 12:
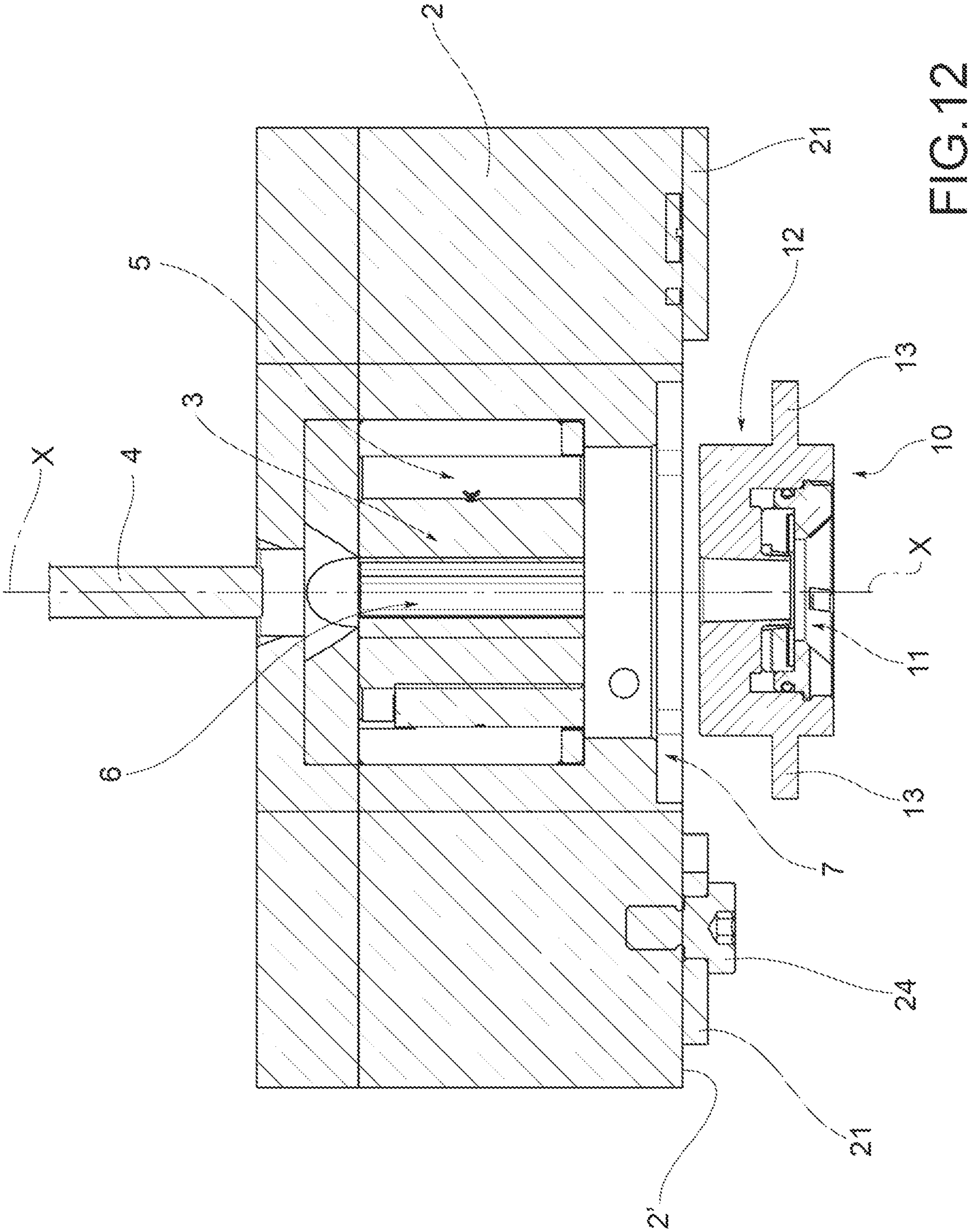
FIG. 12 shows a sectional view of a detail of the compression box of FIG. 11, relating to a bottle centering device and the respective fastening means in the unlocking position, the section being made according to a section plane XI-XI indicated therein.

As illustrated in FIGS. 10 and 12, each bottle centering device 10 is mounted on the compression box 2 with the central axis X of the respective invitation seat 11 axially centered on the respective cap compression seat 6.

The capping machine 1 further comprises fastening means 20 for removably retaining each bottle centering device 10 in its respective housing seat 7.

According to the invention, the aforesaid fastening means 20 comprise for each bottle centering device 10 at least one movable engagement element 21.

Figure 11:
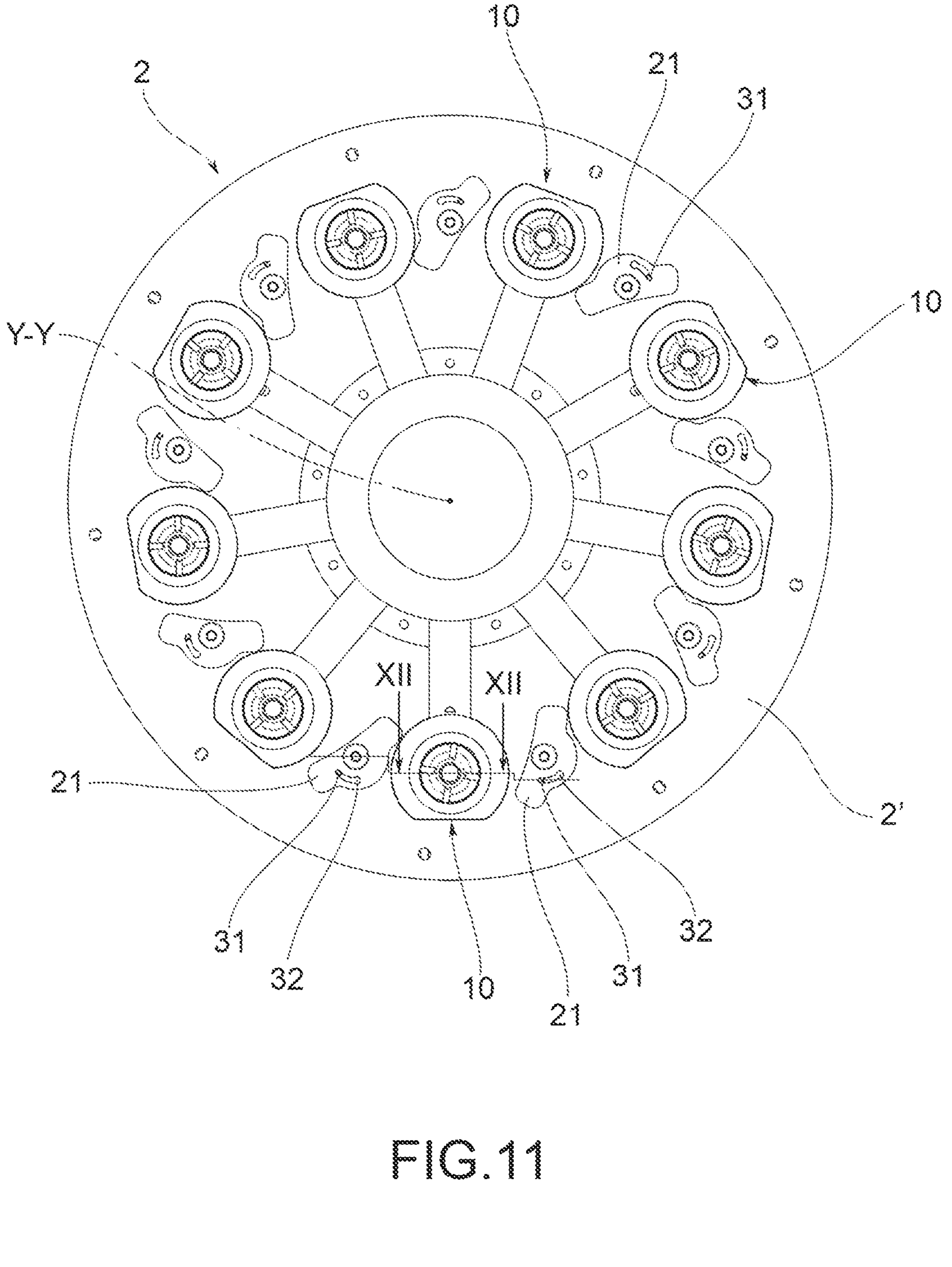
FIG. 11 shows a bottom orthogonal view of the compression box of the multiple capping machine of FIG. 8, illustrated with the fastening means of the bottle centering devices in the unlocking position.

Such movable engagement element 21 is movably associated with the lower face 2' of the compression box to move between:

- a locking position, wherein said at least one movable engagement element 21 interferes with the respective bottle centering device 10 creating an undercut at the housing seat 7 so as to retain the bottle centering device 10 inside the housing seat 7 (see FIGS. 6, 7, 8, 9 and 10); and
- an unlocking position, in which said movable engagement element 21 does not interfere with the respective bottle centering device 10 so that the bottle centering device 10 may freely engage or disengage the housing seat 7 (see FIGS. 11 and 12).

By virtue of the invention, each bottle centering device 10 may be assembled and disassembled from the compression box without the need to remove screw or bolt fastening elements, but simply by moving a mechanical component (the movable engagement element 21) between two different operating positions. This handling operation may be carried out manually without the need to use special tools. This significantly simplifies the disassembly and assembly operations of the bottle centering devices, leading to a reduction in downtime.

The aforementioned movable engagement element 21 always remains associated with the compression box 2 both when it is in the locking position and when it is in the unlocking position. In this way, the operator called to assemble or disassemble the bottle centering devices does not have to worry about keeping the fastening means, since they always remain associated with the compression box, i.e. they always remain in the position of use. This contributes to further reducing the downtime for carrying out assembly/disassembly operations.

Advantageously, as shown in particular in FIGS. 10 and 12, each bottle centering device 10 comprises a support structure 12 which is counter shaped with respect to the housing seat 7 and peripherally delimits the invitation seat 11. The aforementioned movable engagement element 21 is sized in such a way that in the locking position the movable engagement element 21 interferes only with the support structure 12 of the bottle centering device 10 without interfering with the invitation seat 11. In this way, the movable engagement element 21 may perform its function without interfering with the functionality of the bottle centering device 10.

According to the embodiment illustrated in the accompanying figures, the support structure 12 of the bottle centering device 10 comprises an annular portion 13 (preferably flat) extending around said invitation seat 11. In the aforementioned locking position, the movable engagement element 21 interferes with said annular portion 13.

Advantageously, as illustrated in particular in FIG. 10, the housing seat 7 and the bottle centering device 10 are mutually shaped such that, when the bottle centering device 10 is housed in said housing seat 7, the aforementioned annular portion 13 (preferably flat) is arranged flush with the lower face 2' of the compression box 2. In this way, in switching from said unlocking position to said locking position, the aforementioned at least one movable engagement element 21 may slide on the lower face 2' of the compression box and engage the annular portion 13 of the support structure 12 without encountering obstacles which may make the operation not very fluid and difficult.

Preferably, the aforementioned fastening means 20 comprise for each bottle centering device 10 two movable engagement elements 21 which are arranged in different positions with respect to the bottle centering device 10 so as to engage it in different portions when they are in their respective locking positions. In this way, it is possible to lock the bottle centering device 10 in the respective housing seat 7 in a more stable and safe manner.

Preferably, as illustrated in the accompanying figures, the movable engagement element 21 is rotationally associated with the lower face 2' of the compression box 2 in the vicinity of the housing seat 7 and moves between said locking position and said unlocking position with a rotational movement relative to said compression box 2.

According to alternative embodiments not shown in the accompanying figures, the movable engagement element 21 may be movably associated with the lower face 2' of the compression box 2 in proximity to the housing seat 7 in such a way as to move between said locking position and said unlocking position with a translation or roto-translation movement.

According to the preferred embodiment illustrated in the accompanying figures, the movable engagement element 21 may consist of a shaped plate which is pivoted on the lower face 2' of the compression box in proximity to the housing seat 7 so as to face its own face 22 towards the lower face 2' of the compression box 2. In the aforementioned locking position, a portion 23 of said shaped plate partially occludes the housing seat 7.

Preferably, the aforementioned shaped plate which defines the movable engagement element 21 associated with the compression box so as to rotate parallel with respect to the lower face 2' of the compression box 2. In particular, the shaped plate is arranged in such a way that in its rotation movement around the peg 24, the shaped plate slides substantially in contact with the surface of the compression box 2.

Preferably, the capping machine 1 comprises a safety locking device 30 for each movable engagement element 21. Such safety locking device 30 is suitable to reversibly lock the movable engagement element 21 in said locking position. In this way, during the operation of the capping machine 1 the movable engagement element 21 is prevented from accidentally moving from the locking position to the unlocking position, for example due to vibrations.

Preferably, the aforementioned safety locking device 30 may be activated and deactivated manually, without the aid of tools. In this way, the operation of the safety locking device 30 is made more immediate and easier.

According to a preferred embodiment illustrated in the accompanying figures, and in particular in FIGS. 13 to 16, the aforementioned safety locking device 30 consists of a peg 31 protruding axially from the lower face 2' of the compression box 2 and engaging the respective movable engagement element 21 at a slot 32 made on said movable engagement element 21.

Figure 13:
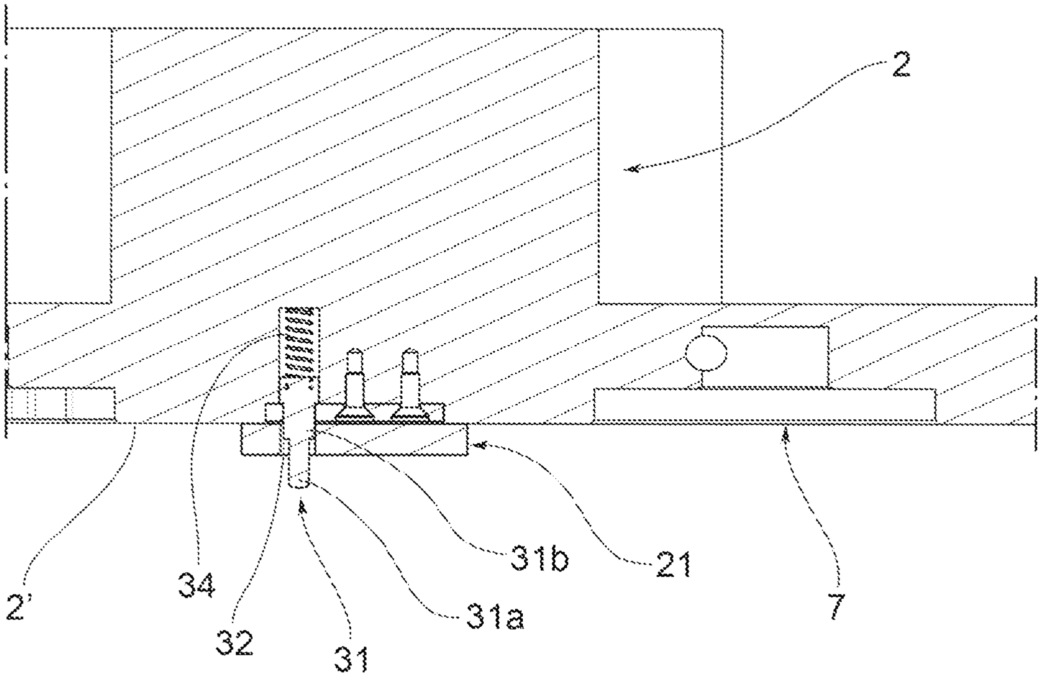
FIG. 13 shows a sectional view of a detail of the compression box of FIG. 9, relating to fastening means in the locking position, the section being made according to a section plane XIII-XIII indicated therein, wherein the bottle centering have been removed for simplicity of illustration.
Figure 14:
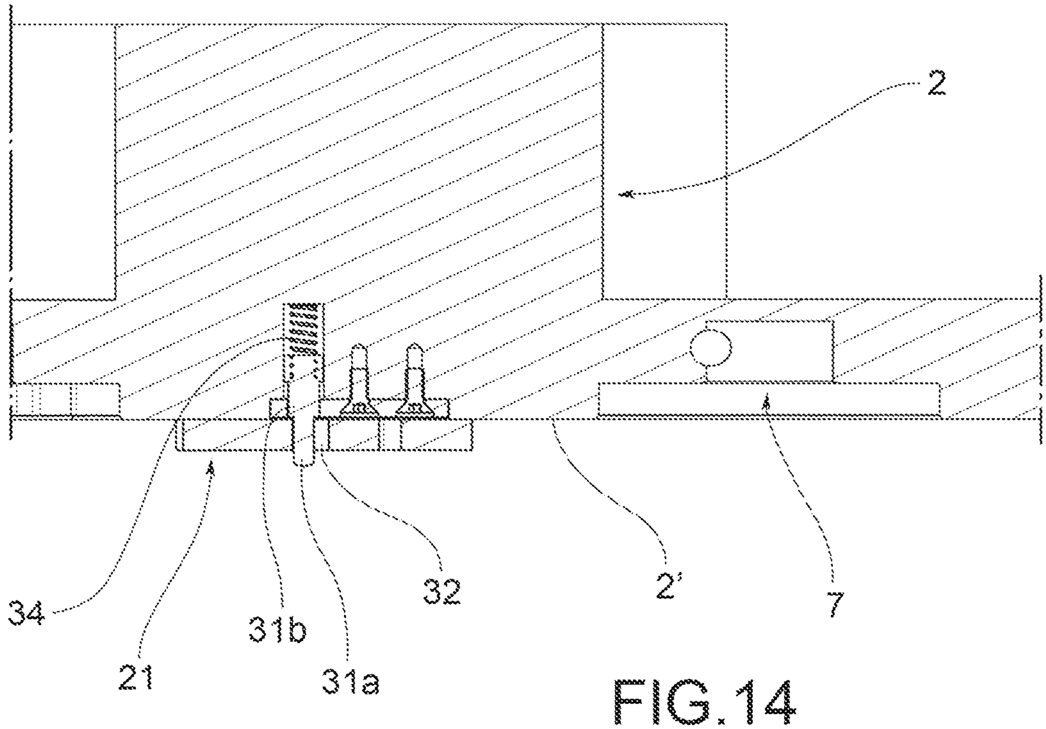
FIG. 14 shows a sectional view of a detail of the compression box of FIG. 11, relating to fastening means in the unlocking position, the section being made according to a section plane XVI-XVI indicated therein, wherein the bottle centering have been removed for simplicity of illustration.
Figure 15:
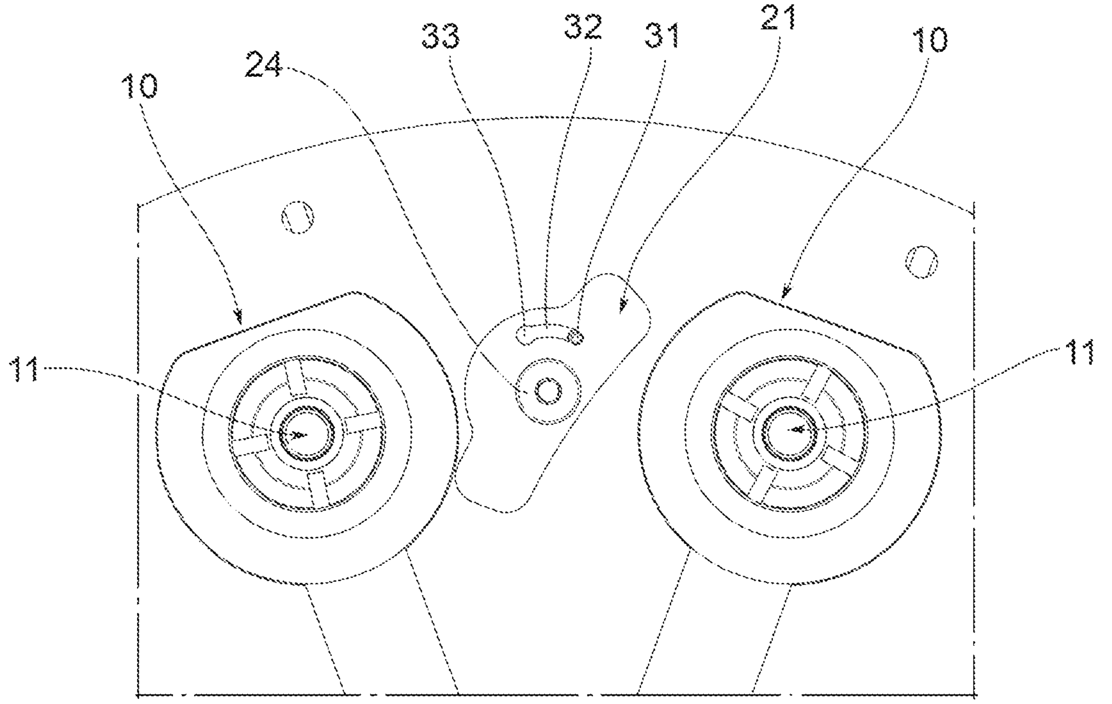
FIG. 15 shows an enlarged detail of FIG. 9, relating to fastening means in the locking position.
Figure 16:
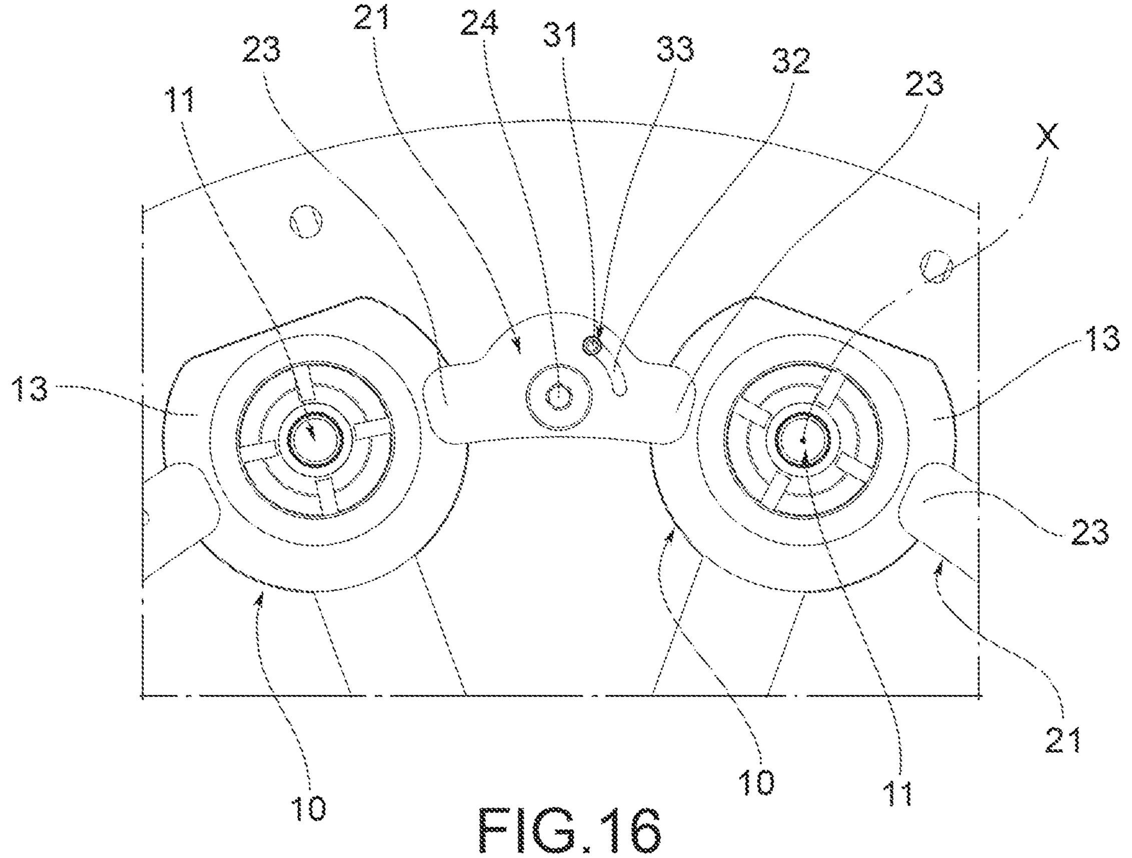
FIG. 16 shows an enlarged detail of FIG. 11, relating to fastening means in the unlocking position.

More in detail, said peg 31 has an axial base portion 31*a* of a larger diameter than an axial tip portion 31*b*, as shown in particular in FIGS. 13 and 14.

The slot 32 is shaped so as to allow relative sliding between the movable engagement element 21 and the axial tip portion 31*b* of said peg 31 in the movement of said movable engagement element 21 between said unlocking position and said locking position.

The aforementioned slot 32 is engageable by the axial base portion 31*a* of said peg 31 only at an enlarged portion 33 of said slot which the peg 31 meets only when the movable engagement element 21 is in the locking position.

In particular, in the preferred case in which the movable engagement element 21 moves between said two locking and unlocking operating positions with a rotation, the aforementioned slot 32 is shaped as an arc of circumference concentric to the axis of rotation of the movable engagement element 21 with respect to the compression box 2. The two ends of the slot define the two limit switches for the movement of the movable engagement element 21. Preferably, the aforementioned enlarged portion 33 is positioned at one of the two ends of the slot 32.

The aforementioned peg 31 is axially movable with respect to said compression box 2 to move between:

- a position of minimum projection, wherein said peg protrudes from the lower face 2' of said compression box only with the axial tip portion 31*b* (see FIG. 14), and
- a position of maximum projection, wherein said peg protrudes from the lower face 2' of said compression box also with the axial base portion 31*a* (see FIG. 13).

The aforementioned peg 31 is subjected to the thrust of elastic means 34 tending to push it axially towards said position of maximum projection so that, as soon as said peg 31 meets the enlarged section 33 of said slot 32, the peg 31 engages the slot 32 with its axial base portion 31*a*, thus firmly locking said movable engagement element 21 in its locking position.

Operationally, the activation of the safety locking device 30 (i.e. the switching from the unlocking position to the locking position) occurs automatically by virtue of the aforementioned elastic means 34. The deactivation of the safety locking device 30 (i.e. the switching from the locking position to the unlocking position) occurs manually by axially lowering the peg 31 overcoming the force of the elastic means 34, which may be suitably sized so as to allow easy manual deactivation of the safety locking device 30 without the use of tools.

As already highlighted above, the capping machine 1 may be:

- single, i.e. provided with a single compression unit and therefore with a single bottle centering device, or
- multiple, i.e. provided with a plurality of compression units and therefore with a plurality of bottle centering devices.

Preferably, the multiple capping machine is of the rotary type.

According to the preferred embodiment illustrated in the accompanying figures, the capping machine 1 is a multiple capping machine, of the rotary type.

More in detail, the multiple capping machine 1 of the rotary type has an annular-shaped compression box 2 axially centered on a rotation axis Y of the capping machine itself. Such compression box 2 is associated with a plurality of compression units 3 angularly distributed about said rotation axis Y. A respective bottle centering device 10 is associated with each compression unit 3. At least one movable engagement element 21 is operatively associated with each bottle centering device 10.

Figure 9:
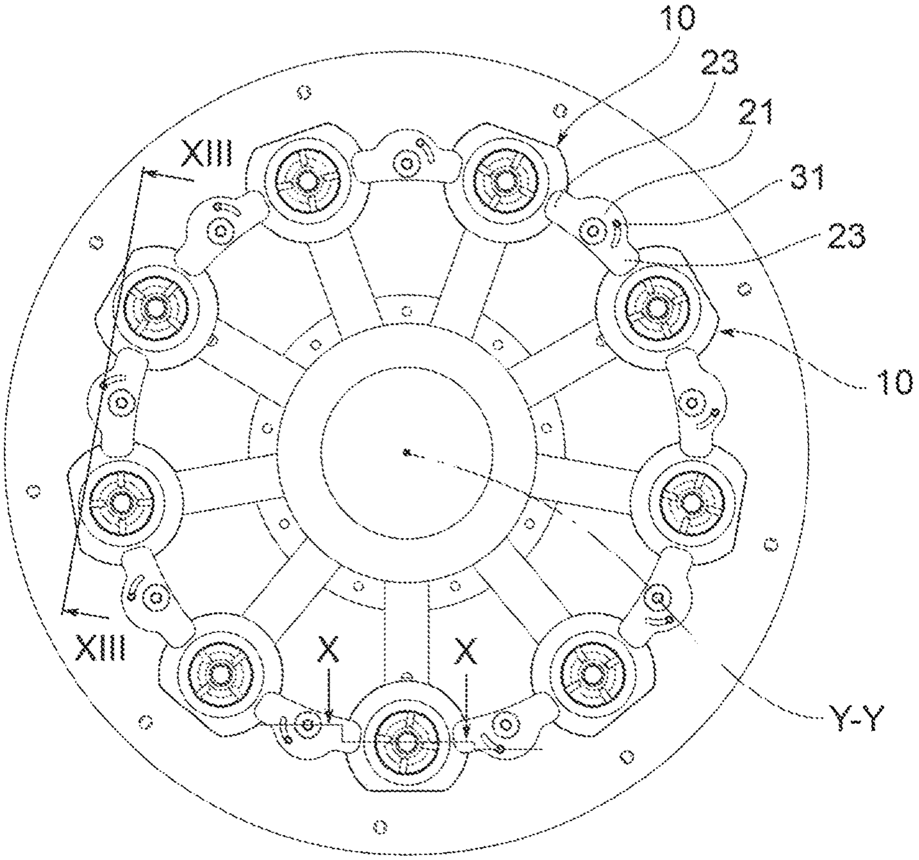
FIG. 9 shows an orthogonal plan view of the compression box of FIG. 8.

Preferably, as shown in particular in FIGS. 9 and 11, each movable engagement element 21 is associated with said compression box 2 in an intermediate position between two adjacent bottle centering devices 10 and is sized such that:

- when it is in the locking position for one of said two bottle centering devices 10, said movable engagement element 21 is also in the locking position for the other bottle centering device; and
- when it is in the unlocking position for one of said two bottle centering devices 10, said movable engagement element 21 is also in the unlocking position for the other bottle centering device.

In this way, in the event that the disassembly of all the bottle centering devices 10 of a multiple capping machine is required (for example following a format change of the mouth of the bottles to be capped), the disassembly and reassembly of the bottle centering devices 10 is significantly simplified and facilitated, with an important reduction in downtimes.

The invention allows numerous advantages to be obtained, which have already been described in part.

The capping machine 1 for caps made of compressible material according to the invention allows the disassembly and disassembly operations of the bottle centering devices to be sped up. The secure fastening means in fact appear as quick coupling and release means, which do not require the use of tools for their handling.

The capping machine 1 for caps made of compressible material according to the invention is not operationally more complex to use than similar machines of known type. On the contrary, this machine 1 is operationally simpler to use as regards the assembly and disassembly of the bottle centering devices.

The capping machine 1 for caps made of compressible material according to the invention is not constructively more complex to produce than similar machines of known type. In fact, the fastening means of the quick coupling and release type do not require particular modifications to the machine 1 and are constructively simple to produce.

The invention thus conceived therefore achieves its intended objects.

Obviously, in practice it may also assume different forms and configurations from the one illustrated above, without thereby departing from the present scope of protection.

Furthermore, all details may be replaced with technically equivalent elements, and the dimensions, shapes, and materials used may be any according to the needs.

The invention claimed is:

1. A capping machine for caps made of compressible material, the capping machine comprising:

a compression box;

one or more compression units, each of the compression units being housed in a cavity made in said compression box and defining a cap compression seat;

a cap insertion punch for each compression unit;

a bottle centering device for each compression unit, wherein each bottle centering device defines an invitation seat for centering a mouth of a bottle to be capped on a central axis and is mechanically associated with said compression box at a housing seat on a lower face of said compression box and is open on said cavity, said bottle centering device being mounted on said compression box with the central axis of said invitation seat axially centered on the respective cap compression seat;

wherein said capping machine comprises a fastener for removably retaining each bottle centering device in a respective housing seat, wherein said fastener comprises for each bottle centering device at least one movable engagement element which is movably associated with the lower face of the compression box to move between:

a locking position, wherein said at least one movable engagement element interferes with the respective bottle centering device creating an undercut at said housing seat to retain the bottle centering device inside said housing seat, and an unlocking position, wherein said movable engagement element is free from interfering with the respective bottle centering device to enable the bottle centering device to freely engage or disengage the housing seat.

2. The capping machine according to claim 1, wherein said bottle centering device comprises a support structure which is counter shaped with respect to said housing seat and peripherally delimits said invitation seat, and wherein said movable engagement element is sized so that in the locking position said movable engagement element interferes only with the support structure of said bottle centering device.

3. The capping machine according to claim 2, wherein the support structure of said bottle centering device comprises an annular portion extending around said invitation seat and wherein in said locking position said at least one movable engagement element interferes with said annular portion.

4. The capping machine according to claim 3, wherein said housing seat and said bottle centering device are mutually shaped such that, when said bottle centering device is housed in said housing seat, said annular portion is arranged flush with the lower face of the compression box.

5. The capping machine according to claim 2, wherein the support structure of said bottle centering device comprises an annular flat portion extending around said invitation seat and wherein in said locking position said at least one movable engagement element interferes with said annular portion.

6. The capping machine according to claim 1, wherein said fastener comprises for each bottle centering device two movable engagement elements arranged in different positions with respect to the bottle centering device so as to engage the bottle centering device in different portions when the movable engagement elements are in respective locking positions.

7. The capping machine according to claim 1, wherein said at least one movable engagement element is rotationally associated with the lower face of the compression box proximate the housing seat and moves between said locking position and said unlocking position with a rotational movement relative to said compression box.

8. The capping machine according to claim 1, wherein said at least one movable engagement element comprises a shaped plate pivoted on the lower face of the compression box proximate the housing seat to orient one face of the at least one movable element towards the lower face of the compression box, and wherein in said locking position a portion of said shaped plate partially occludes said housing seat.

9. The capping machine according to claim 1, comprising a safety locking device for each movable engagement element, wherein said safety locking device is configured to reversibly lock said movable engagement element in said locking position.

10. The capping machine according to claim 9, wherein said safety locking device comprises a peg protruding axially from the lower face of the compression box and engaging said at least one movable engagement element at a slot made on said movable engagement element, said peg having an axial base portion of a larger diameter than an axial tip portion;

wherein said slot is shaped to allow relative sliding between said movable engagement element and the axial tip portion of said peg during movement of said movable engagement element between said unlocking position and said locking position, said slot being engageable by the axial base portion of said peg only at an enlarged section of said slot which the peg meets only when said movable engagement element is in said locking position; and wherein said peg is axially movable with respect to said compression box to move between:

a position of minimum projection, wherein said peg protrudes from the lower face of said compression box only with the axial tip portion, and a position of maximum projection, wherein said peg protrudes from the lower face of said compression box and with the axial base portion, said peg being subjected to thrust of elastic means tending to push said peg axially towards said position of maximum projection so that, when said peg meets the enlarged section of said slot, said peg engages said slot with the axial base portion, thereby firmly locking said movable engagement element in the locking position.

11. The capping machine according to claim 1, wherein said capping machine is a multiple rotary type capping machine, including the compression box having an annular shape axially centered on a rotation axis of said capping machine, said compression box supporting a plurality of compression units angularly distributed around said rotation axis, a respective bottle centering device being associated with each compression unit, at least one movable engagement element being operatively associated with each bottle centering device.

12. The capping machine according to claim 11, wherein each movable engagement element is associated with said compression box in an intermediate position between two adjacent bottle centering devices and is sized such that:

when said movable engagement element is in the locking position for one of said two bottle centering devices, said movable engagement element is also in the locking position for the other bottle centering device; and when said movable engagement element is in the unlocking position for one of said two bottle centering devices, said movable engagement element is in the unlocking position for the other bottle centering device.

13. The capping machine according to claim 1, wherein said at least one movable engagement element consists of a shaped plate pivoted on the lower face of the compression box proximate the housing seat to orient one face of the at least one movable element towards the lower face of the compression box, and wherein in said locking position a portion of said shaped plate partially occludes said housing seat.

* * * * *